United States Patent
King et al.

(10) Patent No.: US 6,745,581 B2
(45) Date of Patent: Jun. 8, 2004

(54) SYSTEMS AND METHODS FOR TEMPERATURE CONTROL IN REFRIGERATION SYSTEMS AND HEATING SYSTEMS

(75) Inventors: Eddie W. King, Kennesaw, GA (US); George Mazereeuw, Freckleton (GB)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/244,951

(22) Filed: Sep. 16, 2002

(65) Prior Publication Data

US 2004/0050075 A1 Mar. 18, 2004

(51) Int. Cl.⁷ .......................... F25B 49/00; G05D 23/00
(52) U.S. Cl. .......................................... 62/131; 236/47
(58) Field of Search ..................... 72/131, 186; 236/47, 236/51

(56) References Cited

U.S. PATENT DOCUMENTS

| | | | |
|---|---|---|---|
| 5,318,224 A | * 6/1994 | Darby et al. | 236/47 |
| 5,428,345 A | * 6/1995 | Bruno | 340/541 |
| 6,166,627 A | * 12/2000 | Reeley | 340/426.25 |
| 6,243,548 B1 | 6/2001 | Hebert et al. | |
| 6,341,252 B1 | * 1/2002 | Foo et al. | 701/45 |

FOREIGN PATENT DOCUMENTS

EP    0707183 A2    10/1995

* cited by examiner

Primary Examiner—Melvin Jones
(74) Attorney, Agent, or Firm—Sutherland Asbill & Brennan LLP

(57) ABSTRACT

The present invention provides systems and methods for temperature control in refrigeration systems, such as beverage coolers, and heating systems, such as coffee dispensers. In an embodiment of the present invention, a control unit of a refrigeration system in accordance with the present invention receives and records activity data such as door openings and/or human presence detection in the vicinity of the refrigeration system, and then establishes the beginning and end times of an energy saving mode for the refrigeration system over a period of time, such as a week. The control unit calculates the time to restart the compressor cycle at the end of the energy saving mode so that the product will be at the correct temperature at the time of first usage. As part of the energy saving function, the lamps and fans in the refrigeration system are controlled independently by the control unit according to the activity data.

24 Claims, 5 Drawing Sheets

Fig. 7

SYSTEMS AND METHODS FOR TEMPERATURE CONTROL IN REFRIGERATION SYSTEMS AND HEATING SYSTEMS

BACKGROUND OF THE INVENTION

I. Field of the Invention

The present invention relates generally to refrigeration systems and heating systems for consumable products, and particularly, controlling the temperature of such systems to maximize energy conservation.

II. Description of Related Art

Beverage coolers are utilized throughout the world to provide cost effective delivery of consumable products in retail stores, outlets and other public distribution points (hereafter collectively referred to as retail stores). Beverage coolers utilize cooling devices to maintain the product at a serving temperature below the ambient temperature. The cooling devices typically includes a compressor to compress a refrigerant and an evaporator to evaporate the refrigerant, as is well known. These refrigerated beverage coolers require energy to operate so it is desirable that a product for sale be maintained at one temperature during business hours and maintained at a second temperature higher than the first temperature during non-business hours to conserve energy. For example, a retailer will set a beverage cooler to operate at 3° Celsius (C) during business hours and 10° C. during non-business hours. Accordingly, the retailer has lower energy expenditures than if the retailer set the cooling device at 3° C. at all times.

One technique to vary the cooling device's temperature is for the beverage cooler to be manually adjusted at the beginning and ending of a business day. Manual adjustment is usually performed by an employee, but is sometimes not done due to the employee's forgetfulness. Also, it may take 30 minutes or more to bring the contents to a serving temperature so the product may not be at the desired serving temperature when the retail store opens. More advanced systems utilize a clock to trigger the change in operation temperature, though this may be problematic if the store has different hours of operation for different days of the week, if the store changes its business hours, or if the time changes seasonally. Yet other systems utilize motion detectors to determine customers are in the vicinity of the beverage cooler, and if so, maintains the normal operating temperature of the beverage cooler.

Likewise, vending machines that serve warm or hot beverages or food may suffer from similar deficiencies in energy management. In order to maintain the beverage or food at its serving temperature (e.g., above ambient), the appliance may continuously actuate the heating device of the appliance or may utilize manual or clock controlled systems for actuating the heating device at various times throughout a day or week.

Thus, there exists an unsatisfied need in the industry for a beverage cooler that is optimized for energy efficiency and product quality, and that is fully automated.

SUMMARY OF THE INVENTION

The present invention provides systems and methods for temperature control in refrigeration systems, such as beverage coolers, or heating systems such as coffee dispensers, so as to optimize functional performance and energy savings. The present invention learns the usage and/or activity patterns associated with a refrigeration system or heating system (hereafter generally referred to as an appliance) and actuates the temperature control device (e.g., a cooling device or heating device) to maintain an optimal operating temperature during periods of use or activity (e.g., when the retail store where the appliance is located is open for business) and actuates the temperature control device to maintain an optimal energy-saving temperature during periods of non-use or inactivity (e.g., when the retail store is closed). The use or activity is determined utilizing a use sensor, which may include one or more of a motion detector, door sensor, product purchase, vibration detector or any other suitable devices for monitoring or sensing activity or use associated with the appliance. The usage and/or activity over a period of time is recorded and then an optimal schedule for actuating the heating and/or cooling device for regular and energy-saving operations is determined and implemented. The usage and/or activity is continuously monitored and should it change, then the present invention will modify the schedule of actuating the heating and/or cooling device accordingly.

In accordance with an aspect of the present invention, a control unit of a refrigeration system in accordance with the present invention receives and records activity data such as door openings and/or human presence detection and/or product purchase in the vicinity of the refrigeration system, and then establishes the beginning and end times of an energy saving mode for the refrigeration system over a period of time, such as a week. The control unit calculates the time to restart the compressor cycle at the end of the energy saving mode so that the product will be at the correct temperature at the time of first usage. As part of the energy saving function, the lamps in the refrigeration system are turned off and on again by the control unit according to the activity data. Once the control unit implements an energy saving mode schedule based on usage patterns, no hourly or daily monitoring is required to provide a product at the correct temperature during business hours of the retail store. Advantageously, the control unit is not dependent on real time, but activity, and therefore can be used in every global time zone. In addition, the usage data collected by the control unit can be used by the retail store to determine traffic patterns in the vicinity of the beverage cooler.

An embodiment of the present invention provides for a system for controlling an appliance, wherein the appliance comprises a temperature control device, the system comprising a use sensor that generates a signal based on the use of (or activity associated with) the appliance, and a control unit that is in communication with the use sensor and that generates a control signal to be provided to the temperature control device, wherein the control signal is based at least partially on historical signals received from the user sensor. The use sensor may comprise an activity sensor for deterring human activity in the proximity of the appliance and/or a human presence detector. The human presence detector may comprise at least one of a motion detector, an infrared sensor and a vibration detector. The appliance may include a storage compartment accessible by a door, and in such instances, the use sensor may comprise a door sensor.

In addition, the control unit may store a plurality of signals received from the use sensor, and then determine a usage pattern for the appliance based on the stored signals. The control unit may then determine a schedule for implementing an energy saving mode of operation for the appliance based on the usage pattern. The appliance may also include operating lights, and wherein the control unit controls the operation of the lights according to the historical signals.

Another embodiment of the present invention provides a system for controlling a refrigeration system, wherein the refrigeration system comprises a storage compartment accessible by a door and a cooling device, the system comprising a human presence detector that generates first signals based on the presence of a human in a proximity of the detector, a door sensor that generates second signals based on openings of the door, and a control unit that is in communication with the human detector and door sensor and that generates a control signal to be provided to the cooling device, wherein the control signal is based at least partially on a historical first and second signals received from the human detector and door sensor.

Yet another embodiment of the present invention provides a method for controlling a refrigeration system, wherein the refrigeration system comprises a cooling device, the method comprising receiving human detector status signals from a human detector based on the presence of a human in a proximity of the human detector, receiving door open signals from a door sensor based on the opening of a door of the refrigeration system, and controlling the cooling device based on a control signal, wherein the control signal is based at least partially on historical human detector status and door open signals received from the human detector and door sensor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is an illustrative usage pattern matrix in accordance with an embodiment of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
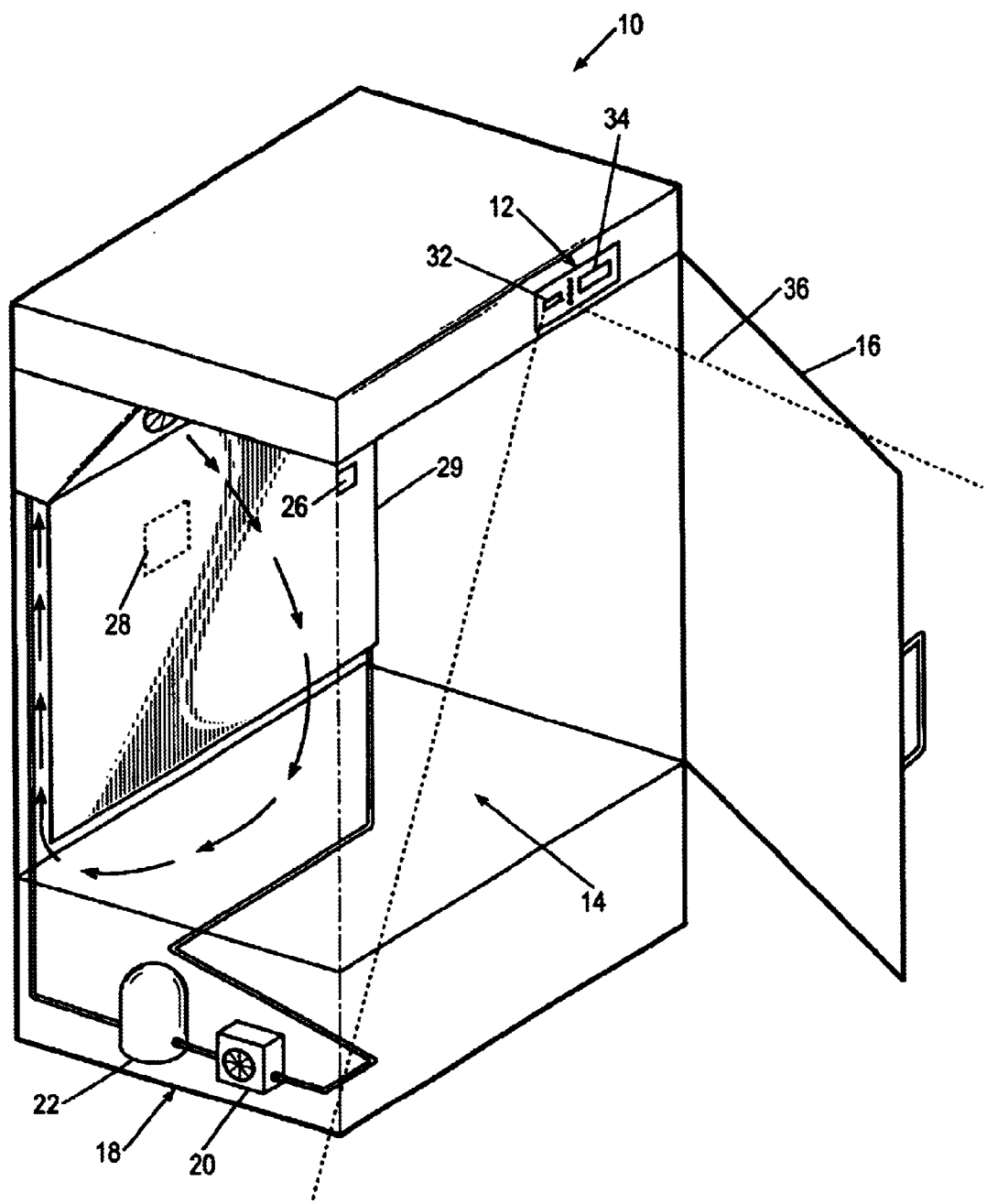
FIG. 1 is a perspective view of an appliance in accordance with an embodiment of the present invention.

With reference to the figures, FIG. 1 shows an appliance 10 including a control unit 12 in accordance with an embodiment of the present invention. The appliance 10 is a refrigeration system configured as a beverage cooler for purposes of illustrating the present invention. It is contemplated, however, that the benefits of the present invention accrue to all appliances, including heating systems refrigeration systems such as refrigerators, refrigerator/freezers, chillers, ice builders or ice makers, refrigerated cabinets, cold storage cells, vending machines, walk in coolers, coffee dispensers, soup dispensers, and hot/cold food dispensers.

The beverage cooler includes a storage compartment 14 accessible by a door 16. A cooling device 18 maintains the storage compartment, and thus the product stored therein, at the desired serving temperature during business hours. The cooling device 18 includes a compressor 20, a condenser 22, and an evaporator (not shown), all of which are well known in the art, as is their operation, and therefore, it is not necessary to describe the compressor 20, condenser 22 and evaporator 24 in detail for purposes of present disclosure.

The refrigeration system 10 also includes a door sensor 26 and a temperature sensor 28 (shown in phantom lines), both of which are in communication with the control unit 12. The door sensor 26 can be any suitable switch capable of detecting when the door 16 of the beverage cooler is opened, such as model no. Series 60A SPST NC manufactured by The General Electric Company. The temperature sensor 28 is preferable disposed in the return air stream 30 for monitoring the temperature of the storage compartment 14. In the illustrated embodiment of FIG. 1, the temperature sensor 28 is located between a backplane 29 and the rear wall of the storage compartment 14, and therefore, is illustrated in phantom lines. The temperature sensor 28 can be any suitable temperature sensor, but is preferably a solid state temperature sensor, such as model no. 2322-640-63103, manufactured by Philips Electronics. Since there is no function component in the system that operates from the vapor pressure of a liquid, the operation of the refrigeration system is independent of atmospheric pressure changes.

The control unit 12 is preferably implemented using a microprocessor or other suitable device or circuit. The functionality of the control unit 12, as described herein, can be provided through the use of hardware, software, or a combination thereof. The control unit 12 preferably includes human presence detector 32 and a user interface 34. The human presence detector 32 is a motion detector in the illustrated embodiment, though it can be any suitable device capable of detecting the presence of a human in the vicinity of the refrigeration system 10, such as an infrared sensor or a vibration sensor. A suitable motion detector for use with the present invention is model no. 3RA-E 700570 manufactured by Murata Manufacturing Company. When using this motion detector, it is preferred that the signals received from the motion detector between approximately 300 and 500 milliseconds in duration be considered the detection of a human, though it may be desirable to have a different signal duration for different applications of the present invention. While the human presence detector 32 is illustrated in FIG.1 as integral the control unit 12 and having a detection zone 36, the human presence detector may be disposed remote to the refrigeration system 10 to define substantially the same or a different detection zone (as may be desired). A remote human presence detector can communicate with the control unit 12 by either a wireless communications device or a hard wired connection, as is well known. A user interface 34 is provided for the control unit 12 for display information to the user and for facilitating the input of information by the user. The user interface can take any suitable desire form, such as a keypad, voice recognition, LCD, LED, touch screen, infrared, etc. and combinations thereof.

In accordance with an embodiment of the present invention, a retailer has at least one refrigeration system 10 containing at least one cooled product available for sale. The retailer desires to offer the product at an appropriate temperature during business hours and the retailer also desires to lower energy consumption during non-business hours. The control unit 12 in accordance with an embodiment the present invention initially learns the daily pattern of activity in and/or near the refrigeration system 10 over a period of time (e.g., a week), and then verifies and implements an energy saving mode schedule for operating the refrigeration system in the energy saving mode at appropriate times each over the period of time (e.g., each day of the week).

Specifically, the control unit 12 records door openings and the detection of human presence in the vicinity of the refrigeration system over a period of time to determine periods of non-use within a defined period of time. While both the door opening and human presence detections are monitored in the illustrated embodiment of the present invention, it is within the scope of the present invention to monitor just one or the other, or even another operating parameter indicative of the pattern of usage of the refrigeration system, such as optical detector, noise detectors, etc. To avoid misinterpreting certain activity that takes place when the retail store is close (e.g., restocking the beverage cooler, security guard rounds, etc.) as customer activity, the control unit sets thresholds for both door opening and the detection of human presence within a defined period of time. For example, in an embodiment of the present invention, the control unit considers the retail store open if it detects either two door opening or six human presences within a 30 minute period of time. Otherwise the control unit considers the retail store closed. It is noted, however, that the thresholds and/or length of time under evaluation can be changed to other values as may be desired.

The learned periods of use and non-use are utilized by the control unit 12 to determine an optimal schedule for when the refrigeration system 10 will operate in a normal operating mode or in an energy saving mode. The control unit 12 verifies and implements the optimal schedule for the energy saving mode and continuously monitors door openings and the detection of human presence in the vicinity of the refrigeration system to identify changes in the learned pattern of usage, and if necessary, changes the implemented schedule.

For example, the control unit 12 has a preconfigured normal operating temperature and a preconfigured energy saving mode operating temperature, wherein the normal operating temperature is lower than the energy saving mode operating temperature. The control unit 12 operates as a thermostat to maintain the desired operating temperature according to the implemented energy saving mode scheduled. As an example, the normal operating temperature parameter may be set at 1° C. (Celsius) and the energy saving temperature parameter may be set at 7° C., though these temperatures are merely illustrative. In addition to adjusting the operating temperature during the energy saving mode, the control unit increase the temperature differential (i.e., the number of degrees above the operating temperature that the storage compartment is allowed to increase before the cooling device 18 is actuated in order to lower the temperature back to the operating temperature). For example, the temperature differential during normal operation is 1° C., where the differential during the energy saving mode is 4° C. The control unit preferably actuates the evaporator fan intermittently when the compressor is off to reduce the rate at which the temperature rises during the energy saving mode. Thus, during business hours, the cooling device 18 operates under the control of the control unit 12 so as to maintain the normal operating temperature within the storage compartment 14, and once the business closes, the cooling device operates under the control of the control unit 12 to maintain the energy saving temperature. Note, as an option, the control unit can set the energy saving mode to begin a predetermined number of hours before the store closes since the warming of the product can be a slow process, especially with efficient fan management.

The control unit 12 initiates the compressor cooling cycles of the cooling device 18 for lowering the storage compartment temperature to the normal operating temperature at an appropriate time prior to the retail store opening so that the product in the storage compartment 14 is at the correct serving temperature when the retail store opens for business. While it depends on the ambient temperature, it generally takes approximately 1.5–3 hours (depending on the combination of ambient conditions, traffic and load of the appliance) to lower the temperature of the storage compartment 16 from the energy saving temperature to the normal operating temperature.

The energy saving mode of operation not only controls the operation of the cooling device 18, but it also capable of controlling other aspects of the refrigeration system 10 that may result in reduced energy consumption. For example, in an embedment of the present invention, the control unit 12 controls the operation of the light associated with the refrigeration system, such as the lights that illuminate the product within the storage compartment 14 and/or the lights that illuminate the indicia associated with the refrigeration system 10. As with the operation of the cooling device, the operation of the lights is based on the learned patters of usage. In the disclosed embodiment, the lights remain on for a predetermined period of time after the retail store closes and turn on at the approximate time the retail store opens.

Accordingly, the present invention eliminates having the store personnel set the compressor operation back at store closing and start it up again at store opening, or switch the internal and/or advertising lighting on or off. It also overcomes the problems inherent with the use of real time clocks for actuation of the refrigeration system because it adapts to changes in time and user patterns.

Figure 2:
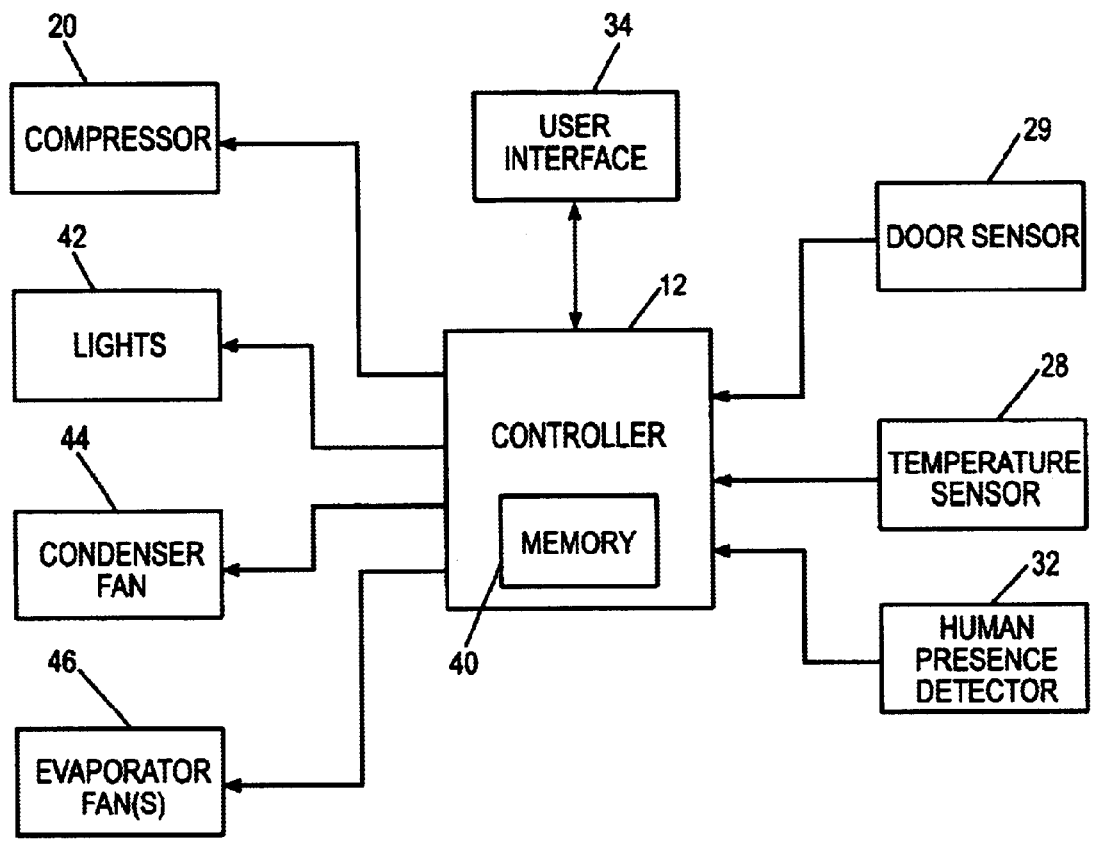
FIG. 2 is a block diagram illustrating a refrigeration controller configuration in accordance to an embodiment of the present invention.

With reference to FIG. 2, the control unit 12 interfaces with a number of devices, such as the door sensor 26, temperature sensor 28 and human presence detector 32. The door sensor 28 preferably registers every door opening, the time point when the door was opened and how long the door was open. That is, the control unit receives and a signal indicative of the door opening (and/or closing) and the control unit makes a record of the event in a memory 34, which can be integral or separate from the control unit 12. The temperature sensor 28 monitors the temperature of the storage compartment 14 in order to maintain the temperature at or about the operating temperature (e.g., either normal or energy saving). In addition, the human presence detector 32 monitors either the traffic or lack thereof in the vicinity of the refrigeration system 10. When a human is detected in the detection zone 36 (see FIG. 1) of the detector, then a signal is sent to the control unit 12 and the event is recorded in the memory 40.

In addition, the control unit 12 interfaces the compressor 20, lights 42, condenser fan 44 and evaporator fans 46. The control unit 12 controls the operation of these devices in accordance with the mode of operation. For example, during the normal operating mode, the compressor 20, condenser fan 44 and evaporator fans 46 are selectively actuated by the control unit 12 to maintain the temperature in the storage compartment 14 (as determined by temperature sensor 28) within the predetermine temperature differential of the normal temperature so that the product is kept at a desired temperature for consumption. Likewise, during execution of the energy saving mode, the compressor 20, condenser fan 44 and evaporator fans 46 are selectively actuated to maintain the temperature in the storage compartment (as determined by the temperature sensor 28) within the predetermine temperature differential of the energy saving mode operating temperature so that the beverages are kept at a desired temperature when the retail store is closed.

With reference to FIG. 3, the learning, verification and execution steps of the present invention are generally shown. As illustrated, each day is broken into 48 thirty minute blocks of time, though it is noted that other intervals of time could be used with the present invention if desired. In the first week the control unit collects data (e.g., door opening and human presence detections) for use in determining the usage patterns for the refrigeration system 10. As shown in FIG. 3, the refrigeration system is installed and powered up on Monday, and the control unit starts collecting data. The refrigeration system runs continuously the first twenty-four hours in order to collect a day's worth of information. The data collected, as shown, is recorded by the control unit, such as in an associated memory. The thresholds for the illustrated embodiment are set so that the retail store is considered open if more than four door openings or six human presence detections (defined as a signal between approximately 350–500 milliseconds) are recorded in a thirty block of time. Note that the information in FIG. 3 for week one is the recorded usage, whereas the information for weeks two and three is the operational mode.

The usage pattern learned the first twenty-four hours of operation is implemented beginning the second day, with the normal operating mode for the cooling device. In addition, the lights are turned at the time the data indicates the retail store opens (e.g., first block of time with either 4 door openings or six human presence detections). At the end of the second day, the control unit will change to the energy saving mode at the time the data indicates the last activity occurs (e.g., first block of time with less than two door openings and less than six human presence detections). In addition, the lights will be turned off a predetermined period of time, such as thirty minutes, after the retail store closes. If a block of time fails to satisfy the normal operational mode during what appears to be business hours for the retail store (e.g., blocks before and after the block in question indicate normal operation mode), then the control unit can be configured to override the data reading and mark that block for normal operation. The verification step discussed below will confirm the override or make the necessary changes to the learned schedule. If the usage pattern changes on the second day, then the pattern executed on the third day will include the change. Each day thereafter, for the remainder of the first week, the pattern learned from the previous day is executed.

In the second week the seven day pattern learned from the first week is verified. FIG. 3 shows the operational modes of the refrigeration system (as opposed to the collected data shown for the first week). If the first and last activity times change, then the isolated incident is re-learned, on a day-by-day basis. Note that according to an embodiment of the present invention, the light remain on for a predetermined period, such as 30 minutes, after the refrigeration system changes to the energy saving mode, and the energy saving mode ends a predetermined period, such as 1.5 hours, before the store opens (in order to have the product chilled to the desired serving temperature by the time the store opens).

In the third week and each week thereafter, the control unit executes the verified pattern from the second week. The control unit continues to monitor activity after the second week and if there is a change in the usage pattern of the refrigeration system, then the control unit will automatically learn the new pattern, verify the new pattern and then execute the new pattern. Since the operational mode is defined by the usage, and not actual time, the present invention can operate in any time zone, change time zones, etc., within having to reschedule changes in the operational mode. The new usage patterns will merely be learned, verified and then executed. No human assistance is needed. In the illustrative embodiment, the activity data is maintained on a minimum of three weeks.

Figure 4:
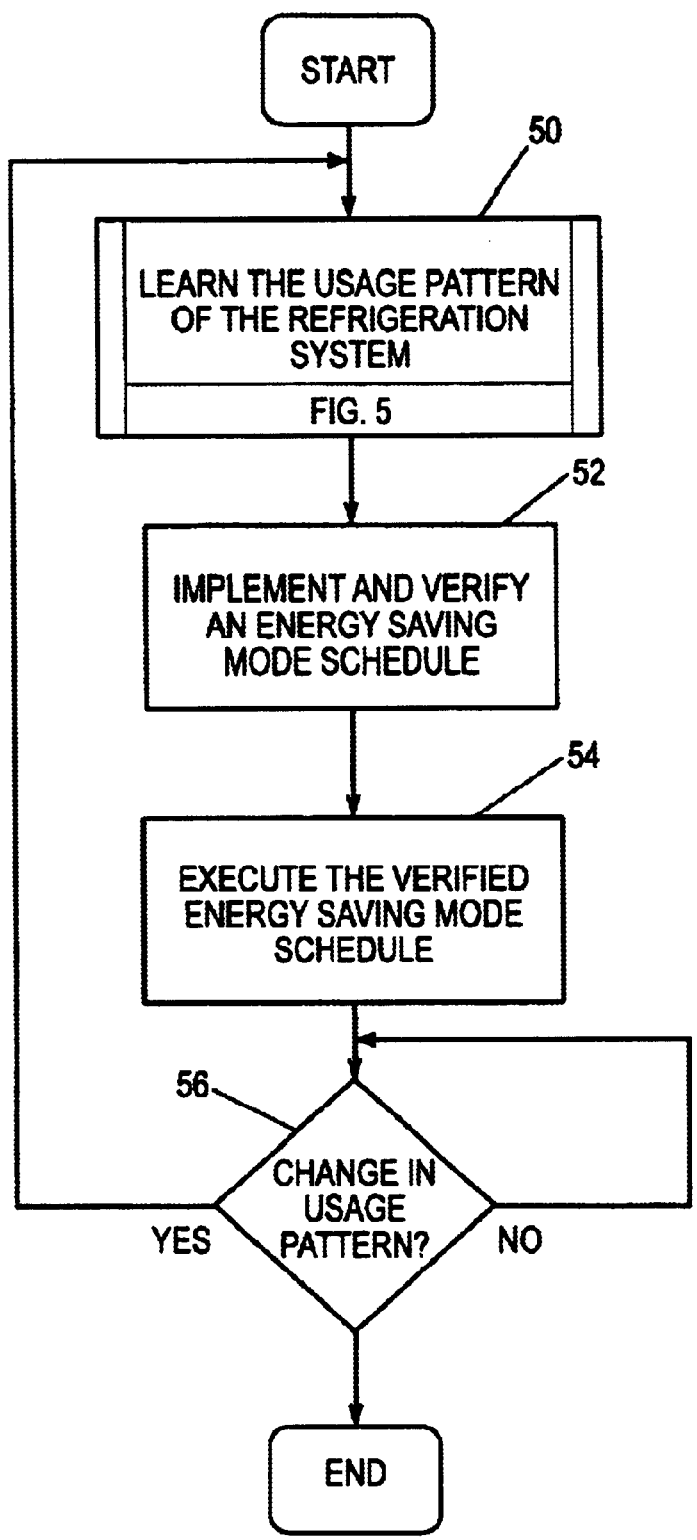
FIG. 4 is a flowchart of the operation of a refrigeration system utilizing a control unit in accordance with an embodiment of the present invention.

With reference to FIG. 4, illustrated is the operation of a refrigeration system utilizing a control unit in accordance with an embodiment of the present invention. In particular, the refrigeration system initially learns the usage pattern for the refrigeration system, as indicated by block 50. At block 52, the learned pattern is then verified, and if appropriate, modified to account for changes detected in the learned pattern. The verified pattern is then executed, as indicated by block 54. If it is determined at block 56 that a change in the verified usage pattern is detected by the control unit during execution of the verified pattern, then the change is re-learned as an isolated incident, verified and implemented, as indicated at block 58.

Figure 5:
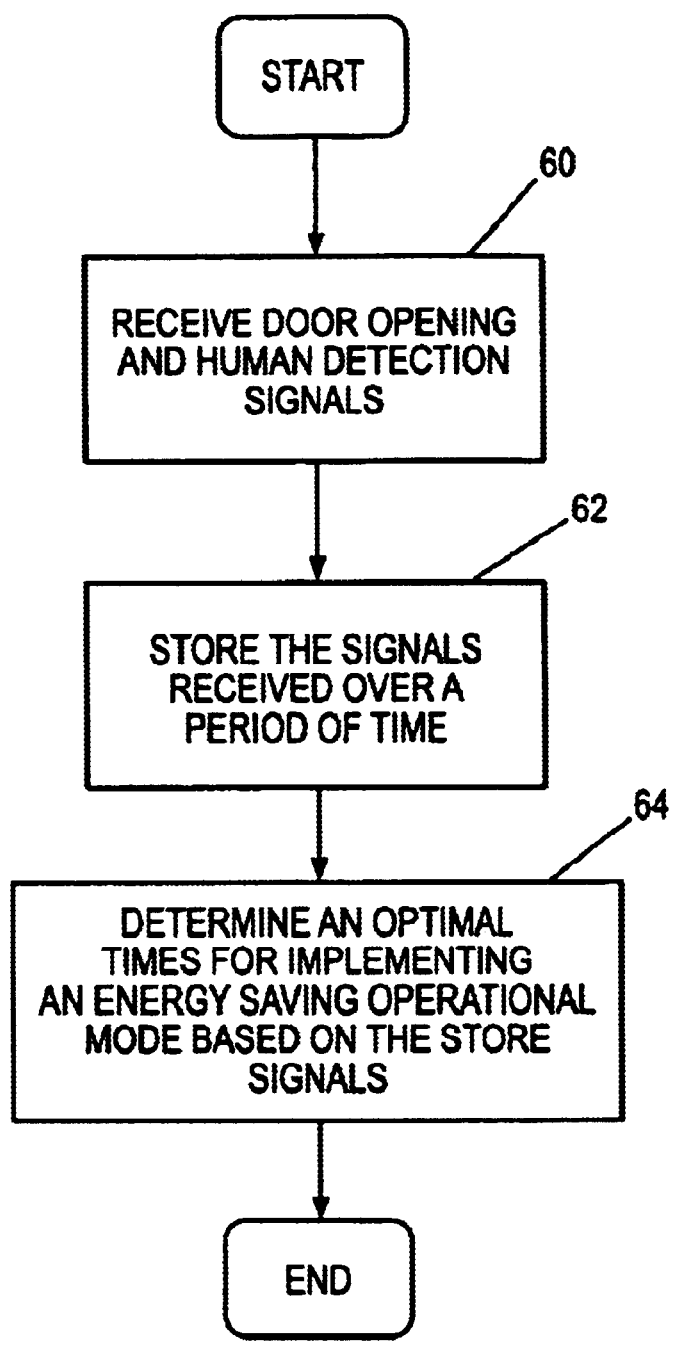
FIG. 5 is a flowchart of the learning step of FIG. 4 in accordance with an embodiment of the present invention.

With reference to FIG. 5, illustrated is the learning step of the flowchart of FIG. 4. Initially, the control unit receives signals indicating a door of the refrigeration system has been opened or the presence of a human in the vicinity of the refrigeration system has been detected, as indicated by block 60. The signals received over a period of time are recorded in a memory, as indicated by block 62. The control unit then determines a usage pattern from the recorded signals and determines the optimal times for executing the energy saving mode of operation, as indicated by block 64.

Other features of the refrigeration system 10 will now be discussed.

I. Voltage Management System

The control unit protects the motors (e.g., the compressor, evaporator fan, condenser fan) under severe variations of voltage at the appliance by implementing the following operations guidelines for which the unit is preset at a variable voltage center measuring the rms value:

(a) The supply voltage drops to 85% of nominal (i.e., the applicable voltage center), all motors are switched off. When the voltage increases to 90% of nominal voltage, the motors are allowed to run, except for the compressor if the "off" period has been less than three minutes;

(b) The supply voltage increases to 115% of nominal, all motors are switched "off" until the voltage drops to 110% of nominal, at which time the motors are allowed to start, except when the compressor has not been "off" for three minutes; and (c) In all cases of re-starting the compressor, the fan motors will be off during the starting of the compressor to ensure execution of the "Soft Start" feature, discussed below.

II. Starting the Compressor

If the compressor has been running within three minutes of a call to restart, then the control unit prevents the compressor from starting until three minutes of "off" time has elapsed. If the compressor has not been running for a period greater than three minutes, then the compressor will start on the signal to start from the control.

III. Soft Start of the Compressor

At any time the compressor is called on to "start", the control unit determines whether the compressor has been "off" for a minimum of three minutes. If not, then the start of the compressor is delayed until it has been off for at least three minutes. The evaporator and condenser fan motors are blocked from starting until the compressor has successfully started. If either motor is running at the time the compressor is called to start, then the motor(s) is de-energized until the starting of the compressor is complete. An example of this is that the evaporator fan(s) runs one minute out of every three minutes that the compressor is "off." If the evaporator fan motor is running at the time the compressor is called to start, the evaporator fan will stop until the compressor has started.

IV. Automatic Defrost Management

The control unit automatically executes evaporator defrost cycles at regular intervals, during which the refrigeration system will be switched "off" to allow the evaporator in the equipment to fully defrost. When the defrost cycle has been completed, the equipment will function with optimal efficiency. The defrost interval and defrost time are consistent with the equipment characteristics. During defrost, the evaporator fan continues to run and the illumination lamps remain on. The circulation of air from the evaporator fan assists in the defrosting cycle. The control will automatically initiate a defrost cycle every four hours for a period of 15 minutes, during which time the compressor is "off" and the evaporator fan runs. However, during a defrost cycle, if the temperature inside the appliance increases to 10.0° C. (i.e., the pre-programmed temperature), for example, due to excessive door opening times, then the control will execute a defrost termination.

As an additional way of detecting unexpected frost on the evaporator, the control monitors the internal temperature of the equipment cabinet and cuts off the compressor if the internal temperature is not declining at a rate consistent with normal operation. The evaporator fans will run for 20 minutes to defrost the evaporator. This action would override the standard defrost cycle.

V. Uninterrupted Pull Down Cycles

If the temperature within the appliance rises above a predetermined temperature, such as 10° C./50° F., the control unit will automatically execute an uninterrupted pull down cycle, which means that it will bring the temperature down to either the operational or the stand-by level without executing defrost cycles or any other disruption of the refrigeration cycle. Once the targeted temperature is achieved, then the control unit will start to implement defrost cycles, fan management, etc. as needed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling an appliance, wherein the appliance comprises a temperature control device, the system comprising:
    a use sensor that generates a signal based on use of the appliance; and
    a control unit that is in communication with the use sensor and that generates a control signal to be provided to the temperature control device, wherein the control signal is based at least partially on historical signals received from the user sensor;
    wherein the control unit stores a plurality of signals received from the use sensor, and determines a usage pattern for the appliance based on the stored signals.

2. The system of claim 1, wherein the use sensor comprises an activity sensor for determining human activity in the proximity of the appliance.

3. The system of claim 1, wherein the use sensor comprises a human presence detector.

4. The system of claim 3, wherein the human presence detector comprises at least one of a motion detector, an infrared sensor and a vibration detector.

5. The system of claim 1, wherein the appliance includes a storage compartment accessible by a door, and wherein the use sensor comprises a door sensor.

6. The system of claim 1, wherein the control unit determines a schedule for implementing an energy saving mode of operation for the appliance based on the usage pattern.

7. The system of claim 1, wherein the appliance includes operating lights, and wherein the control unit controls the operation of the lights according to the historical signals.

8. The system of claim 1, wherein the appliance is a beverage cooler.

9. The system of claim 1, wherein the appliance is a hot beverage dispenser.

10. A system for controlling a refrigeration system, wherein the refrigeration system comprises a storage compartment accessible by a door and a cooling device, the system comprising:
    a human presence detector that generates first signals based on the presence of a human in a proximity of the detector;
    a door sensor that generates second signals based on openings of the door; and
    a control unit that is in communication with the human detector and door sensor and that generates a control signal to be provided to the cooling device, wherein the control signal is based at least partially on a historical first and second signals received from the human detector and door sensor.

11. The system of claim 10, wherein the control unit comprises a microprocessor and associated memory.

12. The system of claim 10, wherein the control unit stores a plurality of signals received from the human presence detector and door sensor, and determines a usage pattern for the refrigeration system based on the stored signals.

13. The system of claim 12, wherein the control unit determines a schedule for implementing an energy saving mode of operation for the refrigeration system based on the usage pattern.

14. The system of claim 13, wherein the schedule provides for activation of the energy saving mode at two or more different times on separate days within a period of seven consecutive days.

15. The system of claim 13, wherein the control unit verifies the schedule over a period of time.

16. The system of claim 13, wherein the control signal is based on the usage pattern.

17. The system of claim 16, wherein the usage pattern is updated when a first predetermined number of first signal or a second predetermined number of second signals is received by the control unit within a predetermined period of time.

18. The system of claim 10, wherein the refrigeration system includes operating lights, and wherein the control unit controls the operation of the lights according to the historical signals.

19. The system of claim 17, wherein the controller controls the operation of the light based at least partially on the signals received from the human detector and door sensor.

20. The system of claim 10, wherein the human presence detector comprises at least one of a motion detector, an infrared sensor and a vibration detector.

21. A method for controlling a refrigeration system, wherein the refrigeration system comprises a cooling device, the method comprising:

receiving human detector status signals from a human detector based on the presence of a human in a proximity of the human detector;

receiving door open signals from a door sensor based on the opening of a door of the refrigeration system; and controlling the cooling device based on a control signal, wherein the control signal is based at least partially on historical human detector status and door open signals received from the human detector and door sensor.

22. The method of claim 21, further comprises storing a plurality of signals received from the human presence detector and door sensor, and determining a usage pattern for the refrigeration system based on the stored signals.

23. The method of claim 22, further comprising determining a schedule for implementing an energy saving mode of operation for the refrigeration system based on the usage pattern.

24. The method of claim 23, wherein the schedule provides for activation of the energy saving mode at two or more different times on separate days within a period of seven consecutive days.

* * * * *

UNITED STATES PATENT AND TRADEMARK OFFICE
CERTIFICATE OF CORRECTION

PATENT NO. : 6,745,581 B2
DATED : June 8, 2004
INVENTOR(S) : King et al.

It is certified that error appears in the above-identified patent and that said Letters Patent is hereby corrected as shown below:

Title page,
Item [56], References Cited, U.S. PATENT DOCUMENTS, please add:

```
-- 4,417,450   A    11/1983  Morgan ....................62/126
   5,054,585   A    10/1991  Amano .....................187/382
   5,252,789   A    10/1993  Sirag, Jr. et al. .............187/385
   5,579,993   A    12/1996  Ahmed et al. ...............236/49.3
   5,714,725   A     2/1998  Thangavelu .................187/382
   5,750,946   A     5/1998  Thangavelu .................187/392
   5,769,314   A     6/1998  Drees et al. ..................236/49.3
   5,822,740   A    10/1998  Haissig et al ...............706/3
   5,841,084   A    11/1998  Thangavelu ................187/382
   6,055,820   A     5/2000  Jeong et al. .................. 62/186
   6,078,856   A     6/2000  Malson ....................701/57
   6,141,570   A    10/2000  O'Neill, Jr. et al. ..........455/574
   6,151,529   A    11/2000  Batko .......................700/28
   6,205,439   B1    3/2001  Gardner ....................706/7
   6,243,626   B1    6/2001  Schanin ...................700/286 --
```

FOREIGN PATENT DOCUMENTS,

-- WO 01/90668 A1 11/2001 --

Signed and Sealed this

Twenty-eighth Day of September, 2004

JON W. DUDAS
*Director of the United States Patent and Trademark Office*